(12) United States Patent
Wallach

(10) Patent No.: US 12,242,653 B2
(45) Date of Patent: *Mar. 4, 2025

(54) DOMAIN CROSSING IN EXECUTING INSTRUCTIONS IN COMPUTER PROCESSORS

(71) Applicant: Micron Technology, Inc., Boise, ID (US)

(72) Inventor: Steven Jeffrey Wallach, Dallas, TX (US)

(73) Assignee: Micron Technology, Inc., Boise, ID (US)

( * ) Notice: Subject to any disclaimer, the term of this patent is extended or adjusted under 35 U.S.C. 154(b) by 60 days.

This patent is subject to a terminal disclaimer.

(21) Appl. No.: 17/511,756

(22) Filed: Oct. 27, 2021

(65) Prior Publication Data

US 2022/0050908 A1   Feb. 17, 2022

Related U.S. Application Data

(63) Continuation of application No. 16/520,299, filed on Jul. 23, 2019, now Pat. No. 11,182,507.

(60) Provisional application No. 62/724,929, filed on Aug. 30, 2018, provisional application No. 62/725,030, filed on Aug. 30, 2018, provisional application No. 62/724,913, filed on Aug. 30, 2018, provisional
(Continued)

(51) Int. Cl.
G06F 21/62       (2013.01)

(52) U.S. Cl.
CPC ................. G06F 21/629 (2013.01)

(58) Field of Classification Search
CPC ...................................... G06F 21/629

USPC ........................................................... 726/17
See application file for complete search history.

(56) References Cited

U.S. PATENT DOCUMENTS 4,386,399 A    5/1983   Rasala et al.
4,409,655 A   10/1983   Wallach et al.
(Continued)

FOREIGN PATENT DOCUMENTS

CN    1920797 A  *  2/2007 ......... G06F 12/1466
CN   101520738         9/2009
(Continued)

OTHER PUBLICATIONS

Wang et al., "Study on a Decision Method for Reconfiguration of Network Security Functions Based on Privilege Transition Graph," 2018 IEEE 18th International Conference on Communication Technology (ICCT), Chongqing, China, 2018, pp. 891-895, doi: 10.1109/ICCT.2018.8600214. (Year: 2018).*
(Continued)

*Primary Examiner* — Peter C Shaw
(74) *Attorney, Agent, or Firm* — Greenberg Traurig

(57) ABSTRACT

Systems, apparatuses, and methods related to securing domain crossing using domain access tables are described. For example, a computer processor can have registers configured to store locations of domain access tables respectively for predefined, non-hierarchical domains. Each respective domain access table can be pre-associated with a respective domain and can have entries configured to identify entry points of the respective domain. The processor is configured to enforce domain crossing in instruction execution using the domain access tables and to prevent arbitrary and/or unauthorized domain crossing.

17 Claims, 7 Drawing Sheets

Related U.S. Application Data application No. 62/724,999, filed on Aug. 30, 2018, provisional application No. 62/724,896, filed on Aug. 30, 2018.

(56) References Cited

U.S. PATENT DOCUMENTS

| | | | |
|---|---|---|---|
| 4,525,780 A | 6/1985 | Bratt et al. | |
| 4,821,184 A | 4/1989 | Clancy et al. | |
| 5,280,614 A | 1/1994 | Munroe et al. | |
| 6,393,544 B1 | 5/2002 | Bryg et al. | |
| 6,446,188 B1 | 9/2002 | Henderson et al. | |
| 6,757,807 B1* | 6/2004 | Jacobson | G06F 9/3826 |
| | | | 712/34 |
| 7,370,193 B2 | 5/2008 | Shao et al. | |
| 7,581,089 B1 | 8/2009 | White | |
| 8,245,270 B2 | 8/2012 | Cooperstein et al. | |
| 8,601,473 B1 | 12/2013 | Aron et al. | |
| 8,607,299 B2 | 12/2013 | Baker | |
| 8,713,563 B2 | 4/2014 | Kondoh et al. | |
| 9,405,515 B1 | 8/2016 | Bertram et al. | |
| 9,519,779 B2 | 12/2016 | Ghosh et al. | |
| 9,575,784 B1 | 2/2017 | Aron et al. | |
| 9,852,084 B1 | 12/2017 | Soderquist et al. | |
| 10,043,001 B2 | 8/2018 | Ghosh et al. | |
| 10,757,100 B2 | 8/2020 | Angelino et al. | |
| 10,915,457 B2 | 2/2021 | Wallach | |
| 10,915,465 B2 | 2/2021 | Wallach | |
| 10,942,863 B2 | 3/2021 | Wallach | |
| 10,984,097 B2 | 4/2021 | Ghosh et al. | |
| 11,182,507 B2 | 11/2021 | Wallach | |
| 11,436,156 B2 | 9/2022 | Wallach | |
| 11,481,241 B2 | 10/2022 | Wallach | |
| 11,500,665 B2 | 11/2022 | Wallach | |
| 11,561,904 B2 | 1/2023 | Wallach | |
| 11,620,239 B2 | 4/2023 | Wallach | |
| 11,914,726 B2 | 2/2024 | Wallach | |
| 2002/0184345 A1 | 12/2002 | Masuyama et al. | |
| 2004/0078631 A1 | 4/2004 | Rogers et al. | |
| 2004/0133777 A1 | 7/2004 | Kiriansky et al. | |
| 2004/0221036 A1 | 11/2004 | Smith | |
| 2005/0188173 A1* | 8/2005 | Hasbun | G06F 12/1466 |
| | | | 711/E12.094 |
| 2005/0257243 A1 | 11/2005 | Baker | |
| 2006/0161719 A1 | 7/2006 | Bennett et al. | |
| 2008/0086729 A1 | 4/2008 | Kondoh et al. | |
| 2008/0091891 A1 | 4/2008 | Shiota et al. | |
| 2008/0104586 A1 | 5/2008 | Thorton et al. | |
| 2008/0162680 A1 | 7/2008 | Zimmer et al. | |
| 2008/0172749 A1* | 7/2008 | Ko | G06F 12/1441 |
| | | | 726/27 |
| 2008/0244206 A1 | 10/2008 | Heo et al. | |
| 2008/0250216 A1 | 10/2008 | Kershaw et al. | |
| 2008/0250217 A1 | 10/2008 | Kershaw et al. | |
| 2008/0276051 A1 | 11/2008 | Renno | |
| 2009/0187724 A1 | 7/2009 | Greiner et al. | |
| 2009/0204785 A1* | 8/2009 | Yates, Jr. | G06F 9/30189 |
| | | | 712/202 |
| 2009/0222816 A1 | 9/2009 | Mansell et al. | |
| 2009/0259846 A1 | 10/2009 | Watt et al. | |
| 2010/0042980 A1* | 2/2010 | Wright | G06F 8/4443 |
| | | | 717/146 |
| 2010/0057960 A1 | 3/2010 | Renno | |
| 2010/0082991 A1* | 4/2010 | Baldwin | H04L 9/083 |
| | | | 380/278 |
| 2010/0162243 A1* | 6/2010 | Barde | G06F 9/45558 |
| | | | 710/5 |
| 2010/0228936 A1 | 9/2010 | Wright et al. | |
| 2010/0228943 A1 | 9/2010 | Deshpande et al. | |
| 2010/0235598 A1 | 9/2010 | Bouvier | |
| 2010/0332788 A1 | 12/2010 | Zhao et al. | |
| 2011/0055528 A1 | 3/2011 | Kondoh et al. | |
| 2011/0231630 A1 | 9/2011 | Dannowski et al. | |
| 2012/0036334 A1 | 2/2012 | Horman et al. | |
| 2012/0042144 A1 | 2/2012 | Grisenthwaite | |

| | | | |
|---|---|---|---|
| 2013/0132690 A1 | 5/2013 | Epstein | |
| 2013/0132695 A1 | 5/2013 | Heo et al. | |
| 2013/0151831 A1 | 6/2013 | Bealkowski et al. | |
| 2013/0326193 A1 | 12/2013 | Mccarthy et al. | |
| 2014/0068137 A1 | 3/2014 | Kegel et al. | |
| 2014/0089616 A1 | 3/2014 | Shanbhogue et al. | |
| 2014/0108701 A1 | 4/2014 | Liljeberg | |
| 2014/0173169 A1 | 6/2014 | Liu et al. | |
| 2014/0282819 A1 | 9/2014 | Sastry et al. | |
| 2014/0331019 A1 | 11/2014 | Parker et al. | |
| 2014/0331023 A1 | 11/2014 | Sharp et al. | |
| 2015/0082305 A1 | 3/2015 | Hepkin et al. | |
| 2015/0100717 A1 | 4/2015 | Bennett et al. | |
| 2015/0128249 A1 | 5/2015 | Alexandrian et al. | |
| 2015/0180894 A1 | 6/2015 | Sadovsky et al. | |
| 2015/0301850 A1 | 10/2015 | Jeong et al. | |
| 2016/0110298 A1 | 4/2016 | Koufaty et al. | |
| 2016/0210082 A1 | 7/2016 | Frank et al. | |
| 2016/0274810 A1* | 9/2016 | Godard | G06F 12/0893 |
| 2016/0299851 A1* | 10/2016 | Mattson, Jr. | G06F 12/145 |
| 2016/0350019 A1 | 12/2016 | Koufaty et al. | |
| 2016/0381050 A1 | 12/2016 | Shanbhogue et al. | |
| 2017/0060783 A1 | 3/2017 | Chiu et al. | |
| 2017/0367036 A1 | 12/2017 | Chen et al. | |
| 2018/0004681 A1 | 1/2018 | Koufaty | |
| 2018/0048648 A1 | 2/2018 | Angelino et al. | |
| 2018/0060244 A1 | 3/2018 | Godard et al. | |
| 2018/0095902 A1 | 4/2018 | Lemay et al. | |
| 2018/0121125 A1 | 5/2018 | Zeng et al. | |
| 2018/0121665 A1 | 5/2018 | Anderson et al. | |
| 2019/0102537 A1 | 4/2019 | Zhang et al. | |
| 2019/0196983 A1 | 6/2019 | Khosravi et al. | |
| 2020/0073693 A1 | 3/2020 | Wallach | |
| 2020/0073694 A1 | 3/2020 | Wallach | |
| 2020/0073820 A1 | 3/2020 | Wallach | |
| 2020/0073821 A1 | 3/2020 | Wallach | |
| 2020/0073822 A1 | 3/2020 | Wallach | |
| 2020/0073827 A1 | 3/2020 | Wallach | |
| 2020/0074093 A1 | 3/2020 | Wallach | |
| 2020/0074094 A1 | 3/2020 | Wallach | |
| 2021/0141742 A1 | 5/2021 | Wallach | |
| 2021/0149817 A1 | 5/2021 | Wallach | |
| 2021/0157741 A1 | 5/2021 | Wallach | |
| 2021/0240619 A1 | 8/2021 | Earnshaw | |
| 2022/0414019 A1 | 12/2022 | Wallach | |
| 2023/0004420 A1 | 1/2023 | Wallach | |
| 2023/0074273 A1 | 3/2023 | Wallach | |
| 2023/0106598 A1 | 4/2023 | Wallach | |

FOREIGN PATENT DOCUMENTS

| | | | | |
|---|---|---|---|---|
| CN | 105550014 A | * | 5/2016 | |
| GB | 2448149 A | * | 10/2008 | G06F 12/14 |
| GB | 2448151 A | * | 10/2008 | G06F 12/14 |
| GB | 2506501 A | * | 4/2014 | G06F 12/1458 |
| WO | WO-0152064 A2 | * | 7/2001 | G06F 9/44521 |
| WO | WO-2006123265 A1 | * | 11/2006 | H04L 63/10 |
| WO | 2013174503 | | 11/2013 | |
| WO | 2013174503 A1 | | 11/2013 | |
| WO | 2016154115 | | 9/2016 | |
| WO | WO-2016164424 A1 | * | 10/2016 | G06F 12/1009 |

OTHER PUBLICATIONS

Qing et al., "A Dynamically Modified Privilege Control Policy," 2006 IEEE Information Assurance Workshop, West Point, NY, USA, 2006, pp. 340-347, doi: 10.1109/IAW.2006.1652115. (Year: 2006).*

Kim et al., "DEMIX: Domain-Enforced Memory Isolation for Embedded System," Basel, Switzerland, Mar. 2023, 10.3390/s23073568. (Year: 2023).*

Inoue et al., "Dynamic security domain scaling on symmetric multiprocessors for future high-end embedded systems," 2007 5th IEEE/ACM/IFIP International Conference on Hardware/Software Codesign and System Synthesis (CODES+ISSS), Salzburg, Austria, 2007, pp. 39-44, doi: 10.1145/1289816.1289830. (Year: 2007).*

(56) References Cited

OTHER PUBLICATIONS

Fan et al., "Cross-Domain Based Data Sharing Scheme in Cooperative Edge Computing," 2018 IEEE International Conference on Edge Computing (EDGE), San Francisco, CA, USA, 2018, pp. 87-92, doi: 10.1109/EDGE.2018.00019. (Year: 2018).*
Zhang et al., "An access control model for multi-level security in multi-domain networking environments," 2017 9th International Conference on Modelling, Identification and Control (ICMIC), Kunming, China, 2017, pp. 809-814, doi: 10.1109/ICMIC2017. 8321566. (Year: 2017).*
Cho et al., "Sharing data between processes running on different domains in para-virtualized xen," 2007 International Conference on Control, Automation and Systems, Seoul, Korea (South), 2007, pp. 1255-1260, doi: 10.1109/ICCAS.2007.4406528. (Year: 2007).*
Kongsgard et al., "Data Leakage Prevention for Secure Cross-Domain Information Exchange," in IEEE Communications Magazine, vol. 55, No. 10, pp. 37-43, Oct. 2017, doi: 10.1109/MCOM. 2017.1700235. (Year: 2017).*
Wang et al., "Research on Safe Privilege Management Model in Trusted-Domains," 2008 International Symposium on Knowledge Acquisition and Modeling, Wuhan, China, 2008, pp. 350-355, doi: 10.1109/KAM.2008.101. (Year: 2008).*
Shi et al., "Overview of Cross-Domain Access Control," 2023 IEEE Smart World Congress (SWC), Portsmouth, United Kingdom, 2023, pp. 1-8, doi: 10.1109/SWC57546.2023.10448810. (Year: 2023).*
Tan et al., "Blockchain-Based Cross-domain Access Control Mechanism," 2022 5th International Conference on Information Communication and Signal Processing (ICICSP), Shenzhen, China, 2022, pp. 499-506, doi: 10.1109/ICICSP55539.2022.10050706 . (Year: 2022).*
Zhang et al., "Research on User Cross-domain Access Control Model Based on Feedback," 2021 International Conference on Intelligent Computing, Automation and Applications (ICAA), Nanjing, China, 2021, pp. 922-928, doi: 10.1109/ICAA53760.2021.00168. (Year: 2021).*
Mouliswaran et al., "Representation of multiple domain role based access control using FCA," 2015 IEEE International Conference on Electrical, Computer and Communication Technologies (ICECCT), Coimbatore, India, 2015, pp. 1-6, doi: 10.1109/ICECCT.2015. 7226062. (Year: 2015).*
He et al., "A Novel Cross-domain Access Control Protocol in Mobile Edge Computing," 2021 IEEE Global Communications Conference (GLOBECOM), Madrid, Spain, 2021, pp. 1-6, doi: 10.1109/GLOBECOM46510.2021.9685650. (Year: 2021).*
Martinsen, Jayce. "Implementation of Intel Virtual Machine Extension Root Operation on the NPS Least Privilege Separation Kernel." Naval Postgraduate School thesis, Sep. 2010.
Vmware. "Mechanisms to determine if software is running in a Vmware virtual machine." Retrieved from the Internet <https://kb. vmware.com/s/article/1009458> on Nov. 23, 2021.
Extended European Search Report, EP19856112.8, mailed on Apr. 14, 2022.
Extended European Search Report, EP19855925.4, mailed on Apr. 11, 2022.
Extended European Search Report, EP19854049.4, mailed on Apr. 7, 2022.
Extended European Search Report, EP19853813.4, mailed on Apr. 4, 2022.
Extended European Search Report, EP19855829.8, mailed on Apr. 11, 2022.
Extended European Search Report, EP19854485.7, mailed on Apr. 11, 2022.
Extended European Search Report, EP19854059.3, mailed on Apr. 11, 2022.
Extended European Search Report, EP19854058.5, mailed on Apr. 20, 2022.
Fernandez, Eduardo B., et al. "Patterns for the secure and reliable execution of processes." Pattern Languages of Programs, ACM, Oct. 18, 2008.
Vilanova, Lluis, et al. "CODOMs: Protecting Software with Code-centric Memory Domains." IEEE, Jun. 14, 2014.
Vilanova, Lluis. "CODOMs: Protecting Software with Code-centric Memory Domains." IEEE, 2014.
Security Configuration for Memory Address Translation from Object Specific Virtual Address Spaces to a Physical Address Space, U.S. Appl. No. 16/520,311, filed Jul. 23, 2019 Inventor: Steven Wallach Status: Non Final Action Mailed Status Date: Jul. 8, 2021.
Access Control for Processor Registers based on Execution Domains, U.S. Appl. No. 16/520,290, filed Jul. 23, 2019 Inventor Steven Wallach Status: Docketed New Case—Ready for Examination Status Date: Aug. 23, 2019.
Memory Configured to Store Instructions of a Predefined Set of Domains Controllable via a Domain Register for Instructions Being Executed in a Computer Processor, U.S. Appl. No. 16/520,298, filed Jul. 23, 2019 Inventor: Steven Wallach Status: Patented Case Status Date: Jun. 25, 2020.
Domain Register for Instructions Being Executed in Computer Processors, U.S. Appl. No. 17/154,722, filed Jan. 21, 2021 Inventor: Steven Wallach Status: Docketed New Case—Ready for Examination Status Date: Aug. 22, 2021.
Domain Crossing in Executing Instructions in Computer Processors, U.S. Appl. No. 16/520,299, filed Jul. 23, 2019 Inventor: Steven Wallach Status: Notice of Allowance Mailed—Application Received in Office of Publications Status Date: Jul. 23, 2021.
Dynamic Configuration of a Computer Processor based on the Presence of a Hypervisor, U.S. Appl. No. 16/520,304, filed Jul. 23, 2019 Inventor: Steven Wallach Status: Non Final Action Mailed Status Date: Aug. 18, 2021.
Virtual Machine Register in a Computer Processor, U.S. Appl. No. 16/520,130, filed Jul. 23, 2019 Inventor: Steven Wallach Status: Non Final Action Mailed Status Date: May 10, 2021.
Memory Access Control through Permissions Specified in Page Table Entries for Execution Domains, U.S. Appl. No. 16/520,292, filed Jul. 23, 2019 Inventor: Steven Wallach Status: Patented Case Status Date: Jan. 20, 2021.
Memory Access Control through Permissions Specified in Page Table Entries for Execution Domains, U.S. Appl. No. 17/158,979, filed Jan. 26, 2021 Inventor: Steven Wallach Status: Docketed New Case—Ready for Examination Status Date: Aug. 22, 2021.
Security Configurations in Page Table Entires for Execution Domains Using a Sandbox Application Operation, U.S. Appl. No. 16/520,296, filed Jul. 23, 2019 Inventor: Steven Wallach Status: Patented Case Status Date: Jun. 25, 2020.
Security Configurations in Page Table Entries for Execution Domains, U.S. Appl. No. 17/170,763, filed Feb. 8, 2021 Inventor: Steven Wallach Status: Docketed New Case—Ready for Examination Status Date: Aug. 22, 2021.
Lluis Vilanova, et al. "CODOMs: Protecting Software with Code-centric Memory Domains." ACM SIGARCH Computer Architecture News, vol. 42, Issue 3, Jun. 2014.
"Hash table. Collision resolution by chaining (closed addressing)", Algorithms and Data Stroutures: with Implementations in Java and C++, http://www.algolist.net/Data_structures/Hash_table/Chaining, printed on Aug. 30, 2018.
Call stack, Wikipedia, printed on Aug. 10, 2018.
Capability-based addressing, Wikipedia, printed on Sep. 13, 2018.
Explain Hashed page tables in operating system, https://cs. stackexchange.com/questions/85207/explain-hashed-page-tables-in-operating system, printed on Aug. 17, 2018.
G. J. Myers, B. R. S. Buckingham, "A Hardware Implemenation of Capability-based Addressing", ACM SIGARCH Computer Architecture News Homepage archive, vol. 8, Iss. 6, Oct. 1980.
George Radin, Peter R. Schneider, "An Architecture for an Extended Machine With Protected Addressing", May 21, 1976.
Hash table, Wikipedia, printed on Aug. 30, 2018.
Hypervisor, Wikipedia, printed on Apr. 19, 2018.
International Search Report and Written Opinion, PCT/US2019/ 048015, mailed Dec. 12, 2019.
International Search Report and Written Opinion, PCT/US2019/ 048006, mailed Dec. 11, 2019.

(56) References Cited

OTHER PUBLICATIONS

International Search Report and Written Opinion, PCT/US2019/048008, mailed Dec. 12, 2019.
International Search Report and Written Opinion, PCT/US2019/048023, mailed Dec. 17, 2019.
International Search Report and Written Opinion, PCT/US2019/048020, mailed Dec. 17, 2019.
International Search Report and Written Opinion, PCT/US2019/048019, mailed Dec. 17, 2019.
International Search Report and Written Opinion, PCT/US2019/048013, mailed Dec. 13, 2019.
International Search Report and Written Opinion, PCT/US2019/048018, mailed Dec. 17, 2019.
Michael D. Schroeder, Jerome H. Saltzer, "A Hardware Architecture for Implementing Protection Rings", Presented at the Third ACM Symposium on Operating Systems Principles, Palo Alto, CA, Oct. 1971.
Page replacement algorithm, Wikipedia, printed on Jul. 31, 2018.
Page table, Wikipedia, printed on Jul. 31, 2018.
Protection ring, Wikipedia, printed on Jul. 31, 2018.
R. S. Fabry, "Capability-Based Addressing", Communications of the ACM, Jul. 1974.
Sandbox (computer security), Wikipedia, printed on Aug. 21, 2018.
Stack register, Wikipedia, printed on Aug. 10, 2018.
The RISC-V Instruction Set Manual, vol. II: Privileged Architecture, May 7, 2017.
Lluis Vilanova et al., "CODOMs: Protecting Software with Code-centric Memory Domains," ACM SIGARCH Computer Architecture News, Jun. 2014.
Zhu, He-fei, et al., "Memory Management Unit Design for Embedded System," Computer Engineering and Applications, No. 1, Abstract only, Jan. 1, 2007.
Fernandez, Eduardo B., et al., "Patterns for the secure and reliable execution of processes." ACM, Oct. 8, 2008.

* cited by examiner

DOMAIN CROSSING IN EXECUTING INSTRUCTIONS IN COMPUTER PROCESSORS

RELATED APPLICATIONS

The present application is a continuation application of U.S. patent application Ser. No. 16/520,299 filed Jul. 23, 2019, which claims priority to Prov. U.S. Pat. App. Ser. No. 62/725,030 filed Aug. 30, 2018, Prov. U.S. Pat. App. Ser. No. 62/724,896 filed Aug. 30, 2018, Prov. U.S. Pat. App. Ser. No. 62/724,913 filed Aug. 30, 2018, Prov. U.S. Pat. App. Ser. No. 62/724,929 filed Aug. 30, 2018, and Prov. U.S. Pat. App. Ser. No. 62/724,999 filed Aug. 30, 2018, the entire disclosures of which applications are hereby incorporated herein by reference.

TECHNICAL FIELD

At least some embodiments disclosed herein relate generally to computer architecture and more specifically, but not limited to, securing domain crossing in execution of instructions in a computer processor.

BACKGROUND

Instructions programmed for a computer can be structured in layers. One layer can provide resources and services for another layer. For example, a hypervisor can create or provision virtual machines that are implemented on the hardware components of the computer. An operating system can offer resources and services using resources available in a computer having predefined architecture. The computer resources or computer operated upon by the operating system can be actual computer hardware components, or virtual machine components provisioned by a hypervisor. An application can provide application specific functions using the services and resources provided by an operating system.

BRIEF DESCRIPTION OF THE DRAWINGS

The embodiments are illustrated by way of example and not limitation in the figures of the accompanying drawings in which like references indicate similar elements.

DETAILED DESCRIPTION

The present disclosure includes the techniques of securing calls for executing routines across different, non-hierarchical, domains.

In a traditional system, different layers of instructions (e.g., user applications vs. operating system) may be given different levels of privilege and/or trust. Conventionally, protection rings have been constructed and implemented in computers to protect data and functionality from fault and malicious behaviors based on a hierarchy of rings. Rings are statically arranged in the hierarchy from most privileged (and thus most trusted) to least privileged (and thus least trusted). For example, the hierarchy can include a ring of operating system kernel that is the most privileged, a ring of device drivers, and a ring of applications that are the least privileged. A program or routine in a lower privilege ring can be limited by a respective special hardware enforced control gate to access the resources and services of a higher privilege ring in the hierarchy. Gating access between rings can improve security.

In the techniques of the present disclosure, instructions or routines programmed for a computer system can be classified into a set of predefined, non-hierarchical, domains, such as a domain of hypervisor, a domain of operating system, a domain of application, etc. One or more domain access tables can be used to specify the entry points that are allowed to make calls to execute routines in domains different from the current domain. Each domain access table can be associated with a respective domain. A set of registers can be used to identify the bases of the domain access tables of the domains. A domain register can be configured in a processor to store an identifier or indicator of the current domain of instructions that are currently being executed in the processor. After a call is successfully processed via a domain access table to execute a routine, the content of the domain register is updated to show the domain of the domain access table used to process the call. When the execution of the called routine returns to the calling routine across domains, the return can be processed in a way similar to a call. Thus, arbitrary and/or unauthorized domain crossing can be prevented.

Figure 1:
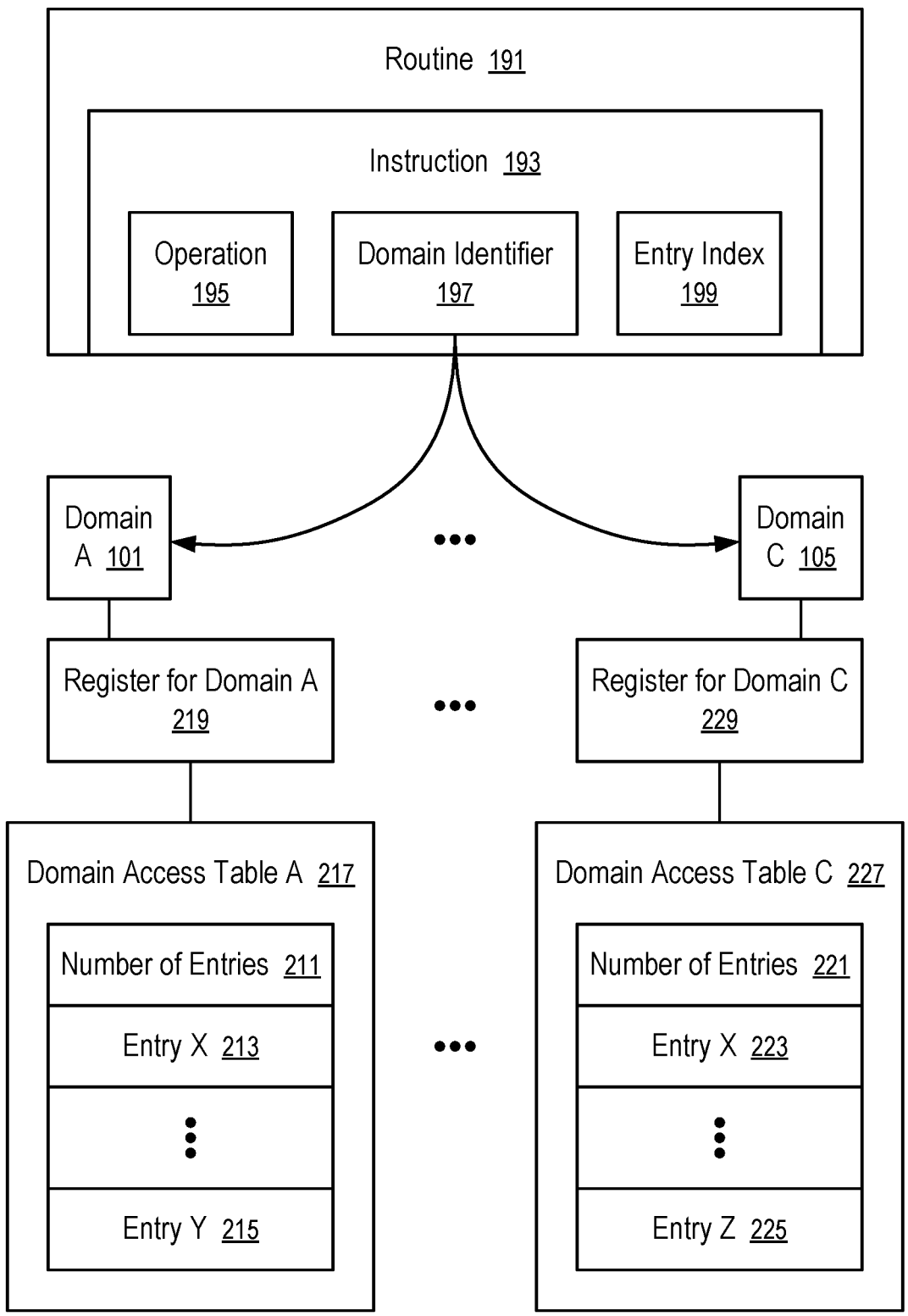
FIG. 1 illustrates the execution of an instruction to access routines in different domains using domain access tables according to some embodiment.

FIG. 1 illustrates the execution of an instruction (193) to access routines in different domains (e.g., 101, . . . , 105) using domain access tables (217, . . . , 227) according to some embodiment.

Routines programmed for a computer system can be classified into various predefined, non-hierarchical, domains (e.g., 101, . . . , 105). Examples of execution domains include a domain of hypervisor, a domain of operating system, a domain of application, etc. A hypervisor or virtual machine monitor (VMM) creates and manages virtual machines. The hypervisor can control basic functions such as physical memory and input/output.

The instruction (193) of a routine (191) that is currently being executed a computer processor in a domain can request the transition into a routine in another domain. Since the instruction (193) of FIG. 1 requests the transition from a source domain to a destination domain, the instruction (193) is configured to identify a domain identifier (197) of the destination domain, in addition to the operation (195) specific to the transaction. For example, the operation (195) can be calling a routine in the destination domain, or returning to a routine in the destination domain from a previous call. The domain identifier (197) in the instruction (193) explicitly identifies the destination domain (e.g., 101, . . . , or 105); and an entry index (199) provided in the instruction (193) specifies an entry point in the domain access table (e.g., 217, . . . , or 227) of the corresponding destination domain (e.g., 101, . . . , or 105). In some implementations, the domain identifier (197) can be specified in a register (or stack) configured to store the identifier (197) of the destination domain for the execution of an instruction (e.g., 193) that requires the transition of execution control (e.g., calling a called routine, or returning back to a calling routine).

In FIG. 1, each domain (e.g., 101, . . . , or 105) has a corresponding register (e.g., 219, . . . , or 229) that identifies the base or memory location of a corresponding domain access table (e.g., 217, . . . , or 229). The computer system is loaded with contents of valid domain access tables (e.g., 217, . . . , or 229)

For example, when the domain identifier (197) is for the domain A (101), its associated register (219) is used to locate the domain access table A (217). The domain access table A (217) stores the number of available entries (211) that can be used in the validation of the entry index (199) for the domain A (101). For example, the processor can validate the entry index (199) provided in the instruction (193) validated against the valid index range defined by the number of available entries (211). If the entry index (199) is valid in view of the number of entries (211) of the domain access table (217), the entry index (199) can be used to look up an entry (e.g., 213, . . . , or 215) in the domain access table A (217). The entry (e.g., 213, . . . , or 215) looked up from the domain access table A (217) can be used to securely transfer execution control from the source domain of the instruction (193) of the routine (191) to the destination domain (101) identified by the domain identifier (197) provided in the instruction (193).

Similarly, when the domain identifier (197) is for the domain C (105), its associated register (229) can be used to locate the corresponding domain access table C (227) that is configured specifically for the domain C (105). The number of entries (221) of the domain access table C (227) is used to check the validity of the entry index (199) provided in the instruction (193); and if the entry index (199) is valid, an entry (e.g., 223, . . . , or 225) is looked up from the domain access table C (227) for transfer execution control from the source domain of the routine (191) containing the instruction (193) to the destination domain (105).

In some implementations, transfer execution control from one domain (101) to another domain (e.g., 105) is permitted only through the pre-defined domain access tables (e.g., 217, . . . , 227). Arbitrary domain crossing is prohibited. Thus, the security of the computer system is improved.

In some implementations, the entries (e.g., 213, . . . , 215; 223, . . . , 225) of the domain access tables (217, . . . , 227) can optionally include permission data for authorization of the transition from source domains to the respective entry points represented by the respective entries (e.g., 213, . . . , 215; 223, . . . , 225).

For example, the entry X (223) for the domain A (105) can have permission data allowing the transition from the domain of the instruction (193) into the entry point in the domain (105) identified by the entry X (223); and the entry Z (225) for the same domain A (105) can have different permission data denying the transition from the same domain of the same instruction (193) into the entry point in the same destination domain (105) identified by the entry Z (225).

In some implementations, the entries (e.g., 213, . . . , 215; 223, . . . , 225) can optionally include security option data for transitioning from the various source domains to the respective entry points represented by the entries (e.g., 213, . . . , 215; 223, . . . , 225).

For example, the entry X (223) for the destination domain (105) can have security option data requiring sandboxing for transition from the source domain of the instruction (193) into the entry point defined by the entry X (223) in the domain (105); and the entry Z (225) for a different entry point in the destination domain (105) can have different security option data not using sandboxing for the transition from the same source domain of the instruction (193) into the entry point defined by the entry Z (225) in the same destination domain (105).

In some implementations, the entries (e.g., 213, . . . , 215; 223, . . . , 225) can provide virtual memory addresses for accessing the routines that are the entry points of the domains (101, . . . , 105). The permission data and security option data can be specified in the page table entries for translating the virtual memory addresses to physical addresses, as discussed further below.

FIG. 1 illustrates an example of using separate domain access tables (217, . . . , 227) for different domains (e.g., 101, . . . , 105). Alternatively, the entries (e.g., 213, . . . , 215; 223, . . . , 225) can be combined in a combined domain access table, where the entries of the tables contain information to identify the domains of the routines identified by the entries (e.g., 213, . . . , 215; 223, . . . , 225). For example, the entries (e.g., 213, . . . , 215; 223, . . . , 225) can be memory addresses for locating the respective routines; and the identifiers of the domains can be encoded or embedded within the memory addresses. In some implementations, a processor is configured to reject domain crossing that are not made using the form of instructions (e.g., 193) illustrated in FIG. 1.

In one implementation, each domain (101, . . . , or 105) has a separate memory area configured to store the values of registers of the respective domain (101, . . . , or 105). Such a separate memory area for storing the values of registers specific to a domain (e.g., 101) while the execution transits temporarily to another domain is accessible the respective domain (e.g., 101) but not accessible to other domains (e.g., 105). Since other domains (e.g., 101) are prevented from accessing the register value region of a given domain (e.g., 105), the register states of the given domain (e.g., 105) are isolated and protected from executions in the other domains (e.g., 101). For example, the memory area for domain specific registers of a particular domain (e.g., 101) can store the value of the program counter (PC) of instructions being executed in the processor, the value of the stack pointer (SP) of a stack for instruction execution, the value of the frame pointer (FP) of the stack, the value of the argument pointer (AP) for the stack, and/or the value of the processor status word (PSW), etc. The particular domain (e.g., 101) can have a separate stack separated from the stacks of the other domains (e.g., 105); and the other domains do not have access to the stack of the particular domain (e.g., 101). When a calling routine running in a domain (e.g., 101) calls, using a domain call instruction (191), to execute a called routine in another domain (e.g., 105), the values of the registers (e.g., PC, SP, FP, AP, PSW) used for the calling domain (e.g., 101) are stored in the memory in the register value region of the calling domain (e.g., 101). Before transitioning the execution from the calling domain (e.g., 101), the processor can store the current values of the registers (e.g., PC, SP, FP, AP, PSW) in the register value region of the calling domain (e.g., 101); and after transitioning the execution to the called domain (e.g., 105), the processor can initialize the register value region of the called domain (e.g., 105). For example, the program counter (PC) of the called domain (e.g., 105) can be initialized to have the value obtained from an entry (e.g., 223, . . . , or 225) of the domain access table (227) of the called domain (e.g., 105), which allows the processor to start the processing the called routine in the called domain (105). When a domain return instruction (191) specifies a destination domain (e.g., 101) to return to, the processor can retrieve the registers values from the register value region of the destination domain (e.g., 101) for the return and initializes the respective registers (e.g., PC, SP, FP, AP, PSW) using the retrieved values. If there is a valid return block in the stack of the destination domain (e.g., 101), the return can be executed to a corresponding return point identified in the stack of the destination domain (e.g., 101) for the return.

Alternatively, and/or in combination, each domain (101, . . . , or 105) can have a separate set of such registers (e.g., PC, SP, FP, AP, PSW), which can function as the register value region of the respective domain (101, . . . , or 105).

Figure 2:
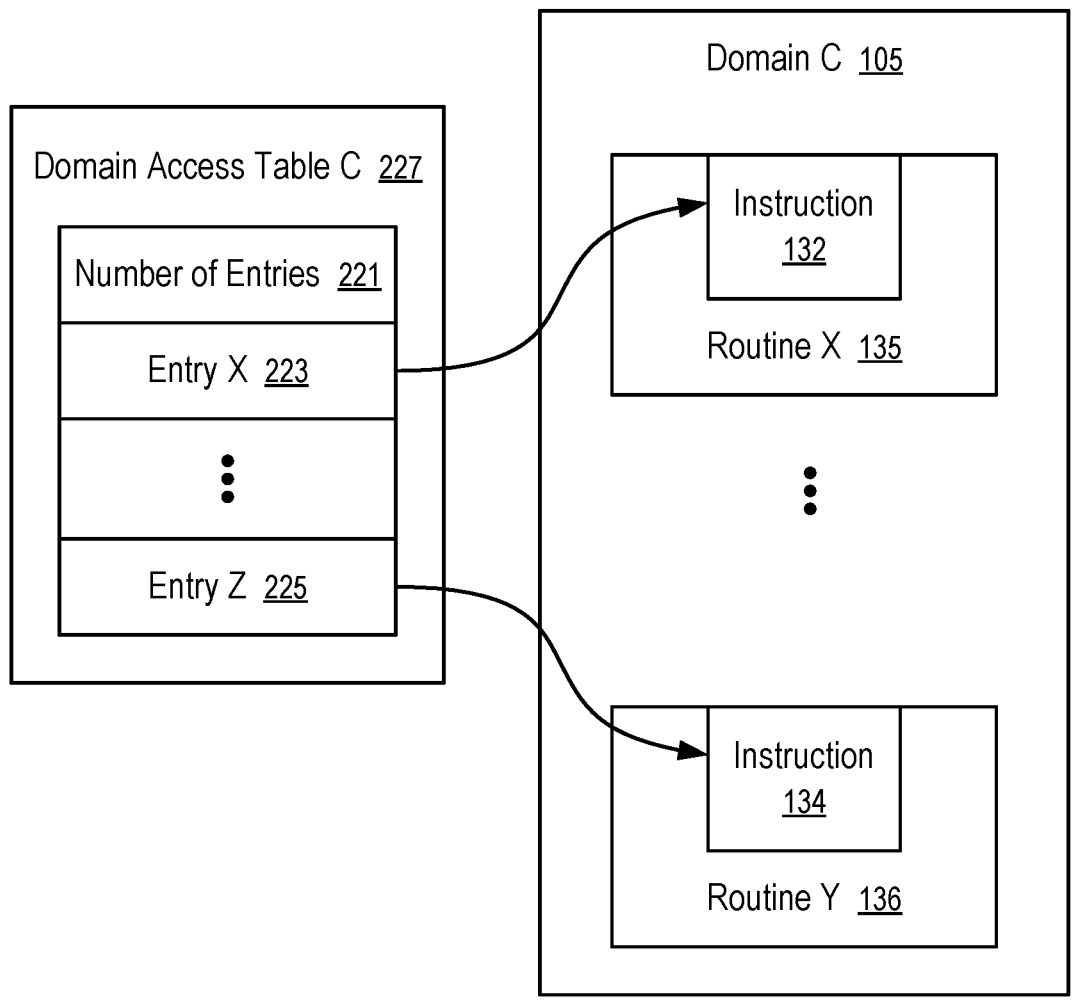
FIG. 2 illustrates the use of a domain access table to access routines in a domain.

FIG. 2 illustrates the use of a domain access table (217) to access routines (135, . . . , 136) in a domain (101).

In FIG. 2, each of the entries (223, . . . , 225) identifies the location of a respective routine (135, . . . , or 136) in the domain (105). For example, the location can be identified as a memory address of an instruction (e.g., 132, . . . , or 134) at the beginning of the respective routine (e.g., 135, . . . , or 136). For example, each entry (223, . . . , or 225) can be a memory address of a corresponding routine (135, . . . , 136); and a processor of the computer system can use the memory address looked up from the domain access table (227) to transfer execution control to the routine that is being called using the instruction (193) of FIG. 1.

Optionally, a domain register of a computer processor can be used to store the domain identifier of the routine (e.g., 191) that is currently being executed in the computer processor. For example, upon the execution of the instruction (193) that causes domain crossing, the content of the domain register can be updated to store the domain identifier (197) of the instruction (193), after the instruction (193) is successfully processed (e.g., using the domain access table (227)) to run the target routine (e.g., 135, . . . , or 136). The content of the domain register can control various security operations of the processor.

For example, when the execution of an instruction results in a request to access a memory location identified using a virtual memory address, the virtual memory address can be translated to a physical memory address using one or more page tables. The content of the domain register can be used to select, from a page table entry, a permission bit for the memory access made in the current domain. The selected permission bit can control the processing of the request to access a memory unit identified by the virtual memory address.

For example, when a call is made to execution a routine having a virtual memory address, the content of the domain register can be used to select a security bit from a page table entry that is used to translate the virtual memory address to a physical memory address. The security bit is selected for executing the routine in providing services for the current domain identified by the domain register. The selected security bit controls security operations of separating resources and/or data between the called routine and the calling routine.

For example, when the execution of an instruction generates a request to access a privileged register, the content of the domain register can be used to select, from a permission register for example, a permission bit for the current domain to access the privileged register. The permission bit can control the acceptance or rejection of the request to access the privileged register.

Figure 3:
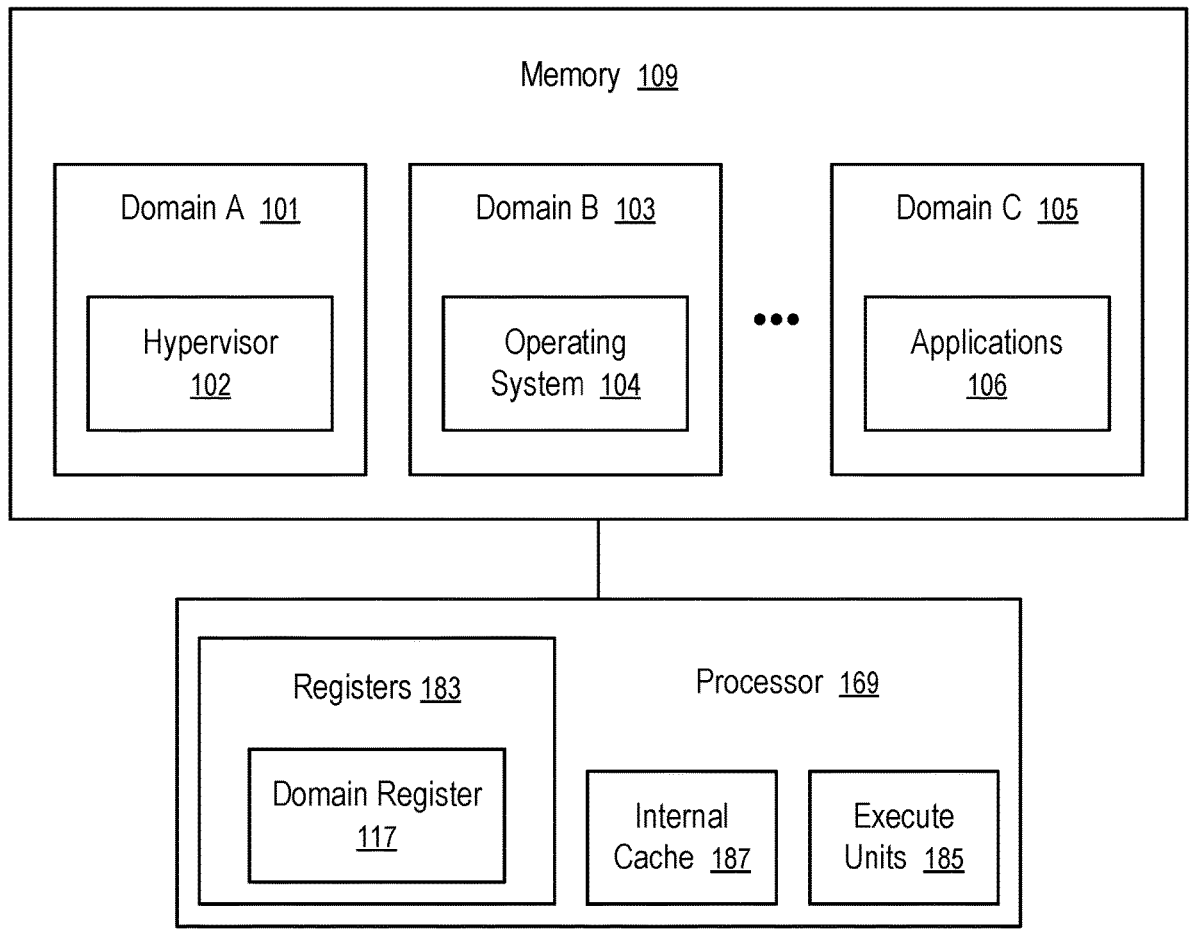
FIG. 3 shows a computer processor having a domain register according to some embodiments.

FIG. 3 shows a computer processor (169) having a domain register (117) according to some embodiments.

The computer processor (169) of FIG. 3 is coupled to memory (109) that stores routines of various predefined, non-hierarchical, domains (101, 103, . . . , 105), such as a domain (101) of hypervisor (102), a domain (103) of operating system (104), a domain (105) of application (106). The physical memory (109) can be used to store data and instructions for various routines programmed for a computer system.

For example, routines of a hypervisor (102) can be classified in a domain A (101); routines of an operating system (104) can be classified in another domain B (103); and routines of applications (106) can be classified in a further domain C (105). A hypervisor or virtual machine monitor (VMM) creates and manages virtual machines. The hypervisor can control basic functions such as physical memory and input/output (I/O).

In general, a routine can include a pre-programmed set of instructions stored in the memory (109). The routine can also have input data, output data, and/or, temporary data stored in the memory (109). A routine can invoke or call another routine for services and/or resources. The calling routine and the called routine can be in a same domain or different domains (e.g., 101, 103, . . . , 105).

The processor (169) of FIG. 3 has execution units (e.g., 185), such as an arithmetic-logic unit. The processor (169) can include an internal cache (187) as a proxy of a portion of the memory (109). The processor (169) has registers (183) to hold instructions for execution, data as operands of instructions, and/or results of instruction executions.

The domain register (117) is one of the registers (183) of the processor (169). The domain register (117) stores the identifier or indicator of a current domain of a set of instructions (e.g., a routine) being executed in the processor (169). The content of the domain register (117) controls security operations in the processor (169) as further discussed below.

In one implementation, when a computer system having the processor (169) is initially powered on (bootstrapped), the processor (169) is configured to automatically execute routines of a hypervisor (102) or an operating system (104) (if no hypervisor is used). This is part of the bootstrap process. Thus, the domain register (117) is initially set to indicate the domain (101) of the hypervisor (102) or the domain (103) of the operating system (104). Subsequently, the execution control can move from one domain to another domain using instructions (e.g., 193 illustrated in FIG. 1) that identify the destination domains; and the content of the domain register (117) can be updated according to the processing of such instructions (e.g., 193 illustrated in FIG. 1).

Alternatively or in combination, the domain of the currently running routine can be identified based on memory addresses, stored attributes of the routines, etc.

For example, some techniques to specify the current domain (123) in the domain register (117) in the computer processor (169) can be found in U.S. Pat. App. Ser. No. 62/724,999, filed on Aug. 30, 2018 and entitled "Domain Register for Instructions being Executed in Computer Processors," the entire disclosure of which application is hereby incorporated herein by reference.

In some instances, the current domain (123) can be identified from a memory address used to load an instruction (193) of a routine (191) for execution.

For example, the memory address has a predetermined width (e.g., a predetermined number of bits) for the processor (169). The memory address can include a portion representing an object ID and a portion representing an offset within the object represented by the object ID. For example, the routine (191) can be an object located at the address; and the object ID of the address can be used to identify certain proprieties of the instruction (193) and/or the routine (191); and the current domain (123) can be determined from the properties.

For example, a static object ID of a predetermined value (e.g., 0) can be used to represent a kernel object of an operating system (104). Thus, the static object ID specified in the memory address can be used to identify the current domain (123) for the execution of the routine (191). Some details and examples of static object IDs in memory addresses for computer processors to load instructions for execution can be found in U.S. patent application Ser. No. 16/028,840, filed Jul. 6, 2018 and entitled "Static Identifications in Object-based Memory Access," the entire disclosure of which application is hereby incorporated herein by reference.

In some instances, the object ID of a memory address can include a portion representing an object type. For example, an object type of a value from 0 to 3 can be used to identify a kernel object of an operating system. For example, an object type of a value of 4 to 5 can be used to specify that the offset is an address of different widths (e.g., a 64-bit address or 32-bit address included within the memory address that has 128 bits). For example, an object type of a value of 6 to 7 can be used to specify that a predetermined portion of the object ID is to be interpreted as an identifier of a local object or an object in Partitioned Global Address Space (PGAS). For example, an object type of a value of 32 can be used to specify that the remaining portion of the object ID is to be interpreted as an identifier of an object defined in a server (e.g., 197). For example, an object name server can store data indicating the name of an object represented by an object ID, access control parameters of the object, and/or other attributes of the object.

For example, the object ID (199) of the memory address used to load the routine (191) for execution can have attributes stored in the object name server. The attributes can be used to determine or infer the current domain (123) of the routine loaded from the memory address.

In some instances, the routine (191) has attributes that are stored in association with the routine (191) (e.g., in the memory (109), in a page table entry for the determination of a physical address of the instruction (193), in an entry table for making calls for the execution of routines). When the routine (191) is loaded for execution, the attributes of the routine (191) are used to determine the current domain (123) for the execution of the routine (191).

Figure 4:
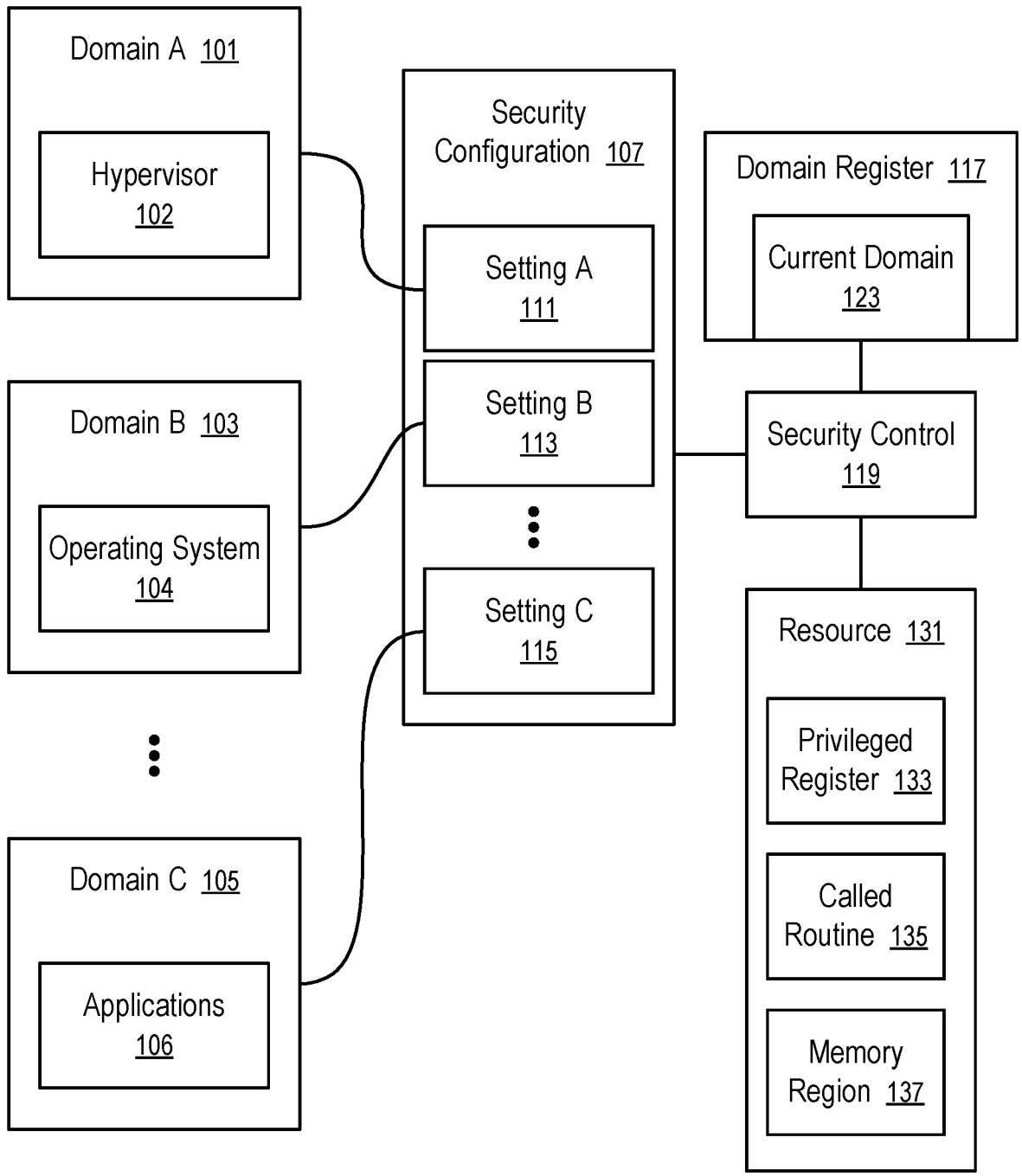
FIG. 4 shows a system to control security operations applied to resources in accordance with a domain register.

FIG. 4 shows a system to control security operations applied to resources (e.g., 131) in accordance with a domain register (117).

In FIG. 4, a security control (119) is implemented based on the current domain (123) specified in the domain register (117), and the security configuration (107) having settings (111, 113, . . . , 115) specified separately for the predefined domains (101, 103, . . . , 105) respectively. The security control (119) is applied to a resource (131), which can be a privileged register (133), a called routine (135), a memory region (137), etc.

The security configuration (107) can have settings (111, 113, . . . , 115) for the domains (101, 103, . . . , 105) respectively, without relying upon a static hierarchy of trust among the domains (101, 103, . . . , 105).

During the executing of a routine (191) in the processor (169), the domain register (117) causes the security control (119) to select a setting (e.g., 111, 113, . . . , or 115) that is pre-associated with a domain (e.g., 101, 103, . . . , or 105) matching with the current domain (123). The selected setting (e.g., 111, 113, . . . , or 115) is used by the security control (119) to customize security operations for the resource (131).

For example, when the execution of an instruction (193) of the routine (191) in the processor (169) requests memory access to the memory region (137), the selected setting (e.g., 111, 113, . . . , or 115) having its pre-associated domain (e.g., 101, 103, . . . , 105) matching the current domain (123) is used by the security control (119) to determine whether the memory access permissible.

For example, different regions (e.g., 137) in the memory (109) can be configured with different security configurations (e.g., 107); and each security configuration (e.g., 107) can include different permissions (e.g., 111, 113, . . . , 115) for different domains (101, 103, . . . , 105). The security configuration (107) can be specified, for example, in a page table entry used in logical to physical address translation of virtual memory addresses, such that the structure of the memory regions can correspond to the memory page structure, as further discussed below in connection with FIG. 5.

For example, the physical memory (109) can be divided into multiple regions; each region (e.g., 137) can be a page of physical memory (109) for memory management, or a set of pages of physical memory (109).

For example, a typical memory region (137) can have a respective security configuration (107) specified for the set of predefined domains (101, 103, . . . , 105). The security configuration (107) explicitly identify the permissions (e.g., 111, 113, . . . , 115) for the domains (101, 103, . . . , 105) respectively. Thus, the privileges of routines to access the memory region (137) are not dependent on a hierarchy of the domains (102, 103, . . . , 105).

In one example, when a routine (191) executed in the current domain (123) causes memory access to the memory region (137) for read, write, or execution of instructions, the domain register (117) causes the security control (119) to check the permission specified in the setting (111, 113, . . . , or 115) that is corresponding to the current domain (123). Whether or not to block (or reject) an access to the memory region (137) for a particular type of operations (e.g., read, write, execution) by the execution of an instruction (193) of the routine (191) in the current domain (123) can be determined based on a respective permission bit that is selected according to the current domain (123) for the memory region (137), and for the type of operations. Some details and examples of permissions for memory access to the memory region (137) can be found in U.S. Pat. App. Ser. No. 62/724,896, filed on Aug. 30, 2018 and entitled "Memory Access Control through Permissions Specified in Page Table Entries for Execution Domains," the entire disclosure of which application is hereby incorporated herein by reference.

In general, different routines of a same domain (e.g., 103) can be configured to in different memory regions and thus configured to have different permissions and security settings for the same domain (e.g., 103).

Further, a routine can be configured to store different portions of its data in different memory regions (e.g., 137) and thus configured to have different permissions for accessing from a same domain (e.g., 101, 103, . . . , or 105).

In another example, when a routine (191) executed in the current domain (123) calls a called routine (135) stored in the memory region (137) for execution, the domain register (117) causes the security control (119) to check the permission specified in the setting (111, 113, . . . , or 115) that is corresponding to the current domain (123). Whether or not to deploy a security measure to protect the resources of the calling routine (191) against the called routine (135) and/or protect the resources of the called routine (135) against the calling routine can be determined based on a respective permission bit that is specified for the current domain (123) and for the memory region (137).

Security measures can include sandboxing. Sandboxing in general includes a computer security measure that isolates the execution of a set of instructions (e.g., an application) from certain system resources and/or other sets of instructions/programs. For example, sandboxing can be implemented using a shadow stack structure where the calling routine and the called routine are configured to use separate stacks and control registers related to the stacks, the calling routine can be prevented from accessing the stack assigned to the called routine, and the called routine can be prevented from accessing the stack assigned to the calling routine. Some details and examples of a shadow stack structure can be found in U.S. Pat. App. Ser. No. 62/724,913, filed on Aug. 30, 2018 and entitled "Security Configurations in Page Table Entries for Execution Domains," the entire disclosure of which application is hereby incorporated herein by reference.

For example, the security configuration (107) of a typical memory region (137) can have sandboxing settings (e.g., 111, 113, . . . , 115) specified for the set of predefined domains (e.g., 101, 103, . . . , 105) respectively. The sandboxing configuration (107) explicitly identifies whether or not a sandboxing operating is required for a call to execution a called routine (135) stored in the region (137). Calls to execute the same routine (135) from routines executed in the different domains (101, 103, . . . , 105) can have different settings (111, 113, . . . , 115); and the settings (111, 113, . . . , 115) specify whether the calls from the respectively domains (101, 103, . . . , 105) require sandboxing (e.g., to protect the called routine (135) and the calling routine (191) from each other). Thus, the sandboxing operations can be selectively applied for the execution of the called routine (135) stored in the memory region (137), based on the current domain (123) identified in the domain register (117) and the explicit settings (e.g., 111, 113, . . . , 115) configured for the respective domains (101, 103, . . . , 105), without relying upon a predefined hierarchy of domains (102, 103, . . . , 105).

For example, a calling routine (191) in the current domain (123) can call the called routine (135). Whether or not to invoke a sandboxing operation for the call to execute the called routine (135) stored in the memory region (137) can be determined based on the sandbox setting (e.g., 111, 113, . . . , or 115) that is specified for the respective domain (e.g., 101, 103, . . . , or 105) matching with the current domain (123) for the memory region (137). Thus, the sandboxing operation can be invoked independent of a relative hierarchy between the domain of the called routine (135) and the current calling domain (123).

The sandbox settings (107) for routines stored in the memory region (137) can be specified, for example, in a page table entry used in logical to physical address translation of virtual memory addresses, such that the structure of the memory regions can correspond to the memory page structure, as further discussed below in connection with FIG. 5.

In a further example, when a routine (191) executed in the current domain (123) requests access to a privileged register (133), the domain register (117) causes the security control (119) to check the permission specified in the setting (111, 113, . . . , or 115) for the privileged register (133). Whether or not to permit or block the access can be determined based on a respective permission bit that is specified for the current domain (123) and for the privilege register (133).

For example, the privileged register (133) can have different permissions (111, 113, . . . , 115) for the different domains (101, 103, . . . , 105) respectively. When an instruction executed in the current domain (123) requests to access the register privileged (133), the domain register (117) causes the security control (119) to select a respective permission (e.g., 111, 113, . . . , or 115) corresponding to the current domain (123) to control the access.

The register (133) can have explicit permissions (111, 113, . . . , 115) specified separately for the domains (101, 103, . . . , 105) respectively (e.g., non-hierarchical), without relying upon a predefined hierarchy of trust for the domains (102, 103, . . . , 105).

In some instances, the privileged register (133) can be accessed for different types of operations, such as read, write, execution, etc. The permission (e.g., 111, 113, . . . , or 115) for a particular domain (e.g., 101, 103, . . . , or 105) to access the privileged register (133) can have separate permission bits for the respective types of operations (e.g., read, write, and/or execution).

The security configuration (107) can be configured to allow an instruction running in one domain (e.g., 101, 103, . . . , 105) to access the register (133) for one type of operations (e.g., read) but not for another type of operations (e.g., write).

The security configuration (107) can be configured to allow an instruction executing in one domain (e.g., 103) to access the register (e.g., 133) via one permission setting (e.g., 113) for the domain (e.g., 103), but prohibit the same instruction running in another domain (e.g., 101) from accessing the register (133) via another concurrent setting (e.g., 111) for that domain (e.g., 101), even when the disallowed domain (e.g., 101) can be more privileged (and thus trusted) than the allowed domain (e.g., 103) in traditional protection rings.

In one implementation, the security configuration (107) is hardwired in a processor for the privileged register (133). In another implementation, the security configuration (107) can be set via firmware for the register (133) of a processor during a start-up/boot up process of a computer system. In a further implementation, the security configuration (107) can be changed via privileged software during the normal operations of the computer system.

For example, the security configuration (107) for the privileged register (133) can be changed when the processor (169) switches from running a program in one domain (e.g., 101) to running a program in another domain (e.g., 103).

For example, the security configuration (107) for the privileged register (133) can be changed in accordance with a request when the computer system switches from running one routine to another routine, where the routines can be in the same domain (e.g., 101).

For example, the security configuration (107) for the privileged register (133) can be configured in a permission register that controls access to the privileged register (133) using permission bits stored in the permission register; and the content of the permission register can be updated by an authorized process to adjust/customize the security level of the computer system for the current computation. Alternatively, permissions bits for different domains (101, 103, . . . , 105) can be specified in separate registers that correspond to the domains (101, 103, . . . , 105) respectively. Some details and examples of permission registers can be found in U.S. Pat. App. Ser. No. 62/724,929, filed on Aug. 30, 2018 and entitled "Access Control for Processor Registers based on Execution Domains," the entire disclosure of which application is hereby incorporated herein by reference.

Since the security control system of FIG. 4 does not rely upon a predefined domain hierarchy of trust (i.e., non-hierarchical), it can provide better flexibility and finer control granularity than the conventional protection rings.

Figure 5:
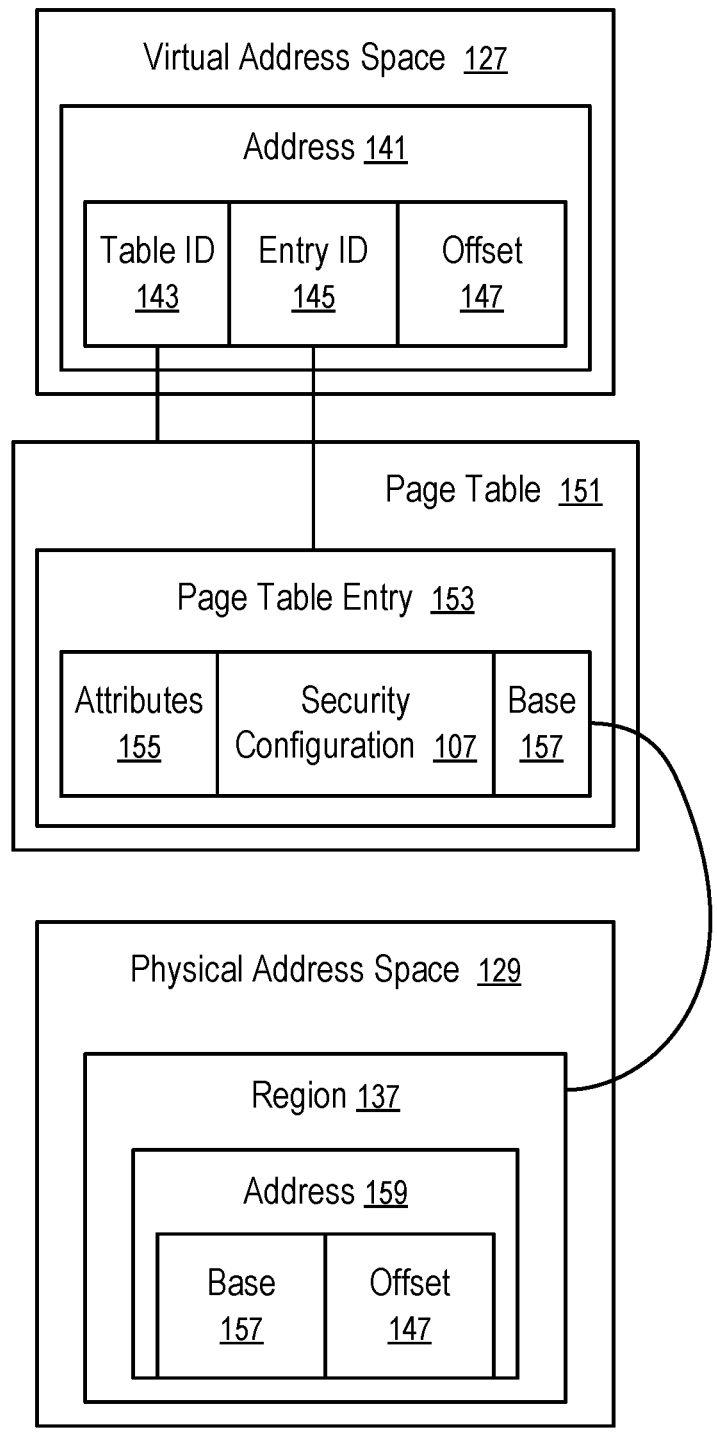
FIG. 5 illustrates a page table entry having a security configuration for execution domains.

FIG. 5 illustrates a page table entry (153) having a security configuration (107) for execution domains (e.g., 101, 103, . . . , 105).

For example, the security configuration (107) in the page table entry can be permissions for accessing the memory region (137) identified by the page table entry (153) and/or sandboxing configuration for calling routines stored in the memory region (137) that is identified by the page table entry (153).

A typical virtual address (141) in a virtual address space (127) can be translated into a corresponding physical address (159) in a physical address space (129) using a page table (151). In general, multiple page tables (e.g., 151) can be used to map the virtual address space (127) to the physical address space (129).

The virtual address (141) can include a table ID (143), an entry ID (145), and an offset (147). The table ID (143) can be used to identify a page table (151) that contains a page table entry (153) for a page that contains the memory unit that is identified by the virtual address (141) and the physical address (159). The entry ID (145) is used as an index into the page table (151) to locate the page table entry (153) efficiently. The page table entry (153) provides a base (157) of the physical address (159). Physical addresses in the same page of memory share the same base (157). Thus, the base (157) identifies the region (137) in the memory (109). The offset (147) of the virtual address (141) is used as a corresponding offset (147) in the page or region (137) in the memory (109). The combination of the base (157) and the offset (147) provides the physical address (159) corresponding to the virtual address (141).

In FIG. 5, the page table entry (153) specifies not only the base (157) for the page or region (137), but also the security configuration (107) for the page or memory region (137), such as permissions for reading data into the memory region (137) corresponding to the base (157), permissions for writing data into the memory region (137), permissions for executing instructions stored in the memory region (137), sandboxing requirements for calling routines stored in the memory region (137). The security configuration (107) can have separate settings (111, 113, . . . , 115) respectively for the predefined, non-hierarchical domains (101, 103, . . . , 105) illustrated in FIGS. 3 and 4. The current domain (137) in the domain register (117) controls which one of the settings (111, 113, . . . , 115) is used for a current memory access, or a current call to a routine (135) stored in the memory region (137).

Optionally, the page table entry (153) can specify other attributes (155) of the page of physical memory, such as whether the data in the page is valid, whether the page is in main memory, whether the page is dirty (e.g., the changes in data in the page of physical memory have not yet been flushed to a longer-term memory/storage device relative to the memory region (137)). For example, the attributes (155) can include a page fault bit indicating whether the page is in the main memory of the computer or in a storage device of the computer. If the permissions in the security configuration (107) allow the current access to the page of memory and the page fault bit indicate that the page is currently not in the main memory of the computer, the memory management unit (181) can swap the page from the storage device into the main memory of the computer to facilitate the access to the page identified by the page table entry (153). However, if the permissions in the security configuration (107) deny the current access to the page for the current execution domain, it is not necessary to evaluate the page fault bit and/or to swap in the page corresponding to the page table entry (153).

In general, the table ID (143) can be divided into multiple fields used to locate the page table (151). For example, the table ID (143) can include a top table ID identifying a top-level page table and a top table entry ID that is used as an index into the top-level page table to retrieve a page table entry containing an identifier of the page table (151), in a way similar to the entry ID (145) indexing into the page table (151) to identify the page table entry (153) containing the base (157).

In general, an entry ID (145) can be considered a virtual page number in the page table (151); and the virtual page number (e.g., 145) can be used in the page table (151) to look up the page table entry (153) containing the base (157).

For example, the table ID (143) can include a set of virtual page numbers that can be used to identify a chain of page tables (e.g., 151). Each virtual page number is used as an index in a page table (or page directory) to identify the page table entry (or page directory entry) that contains the identity or base of the next level page table (or page directory).

In some instances, different running processes in a computer can have different virtual address spaces (e.g., 127); and the process ID of a running process can be used in determine the top-level page table (or page directory). In some instances, a hash of a portion of the virtual address (141), the process ID, and/or an identification of a virtual machine hosted in the computer system can be used to locate the top-level page table (or page directory). In some instances, a hash is used as an index or key to look up a page table entry. Regardless of how the page table entry (153) is located (e.g., via indexing through multiple page tables, via the use of a hash as an index or key), the content of the page table entry (153) can be configured in a way as illustrated in FIG. 5 to provide the security configuration (107) for different domains (101, 103, . . . , 105) to access the page/memory region (137) and/or the routines stored in the memory region (137) that corresponds to the base (157).

In FIG. 5, the security configuration (107) for a page or region (137) is specified in the bottom-level page table (151), where the page table entry (153) in the bottom-level page table (151) provides the base (157) of the physical address (159).

Alternatively, or in combination, higher-level page tables (or page directories) can also have security configurations for their page table entries (or page directory entries). For example, a page table entry (or page directory entry) identifying the page table (151) can have security configurations for all of the pages in the page table (151); and thus, the domain permission data in the page table entry is applicable to the memory region defined by the page table (151). The hierarchy of security configurations in the chain of page table entries leading to the page table (151) and the security configuration (107) in the bottom-level page table entry (153) can be combined via a logic AND operation or a logic OR operation.

For example, a routine running in a domain (e.g., 101, 103, . . . , 105) can be allowed to access a page identified by the base (157) if all of the permission bits in the chain of page table entries leading to the base (157), including the bottom-level table entry (153), have the value that allows access. Alternatively, a routine running in a domain (e.g., 101, 103, . . . , 105) can be allowed to access a page identified by the base (157) if any of the permission bits in the chain of page table entries leading to the base (157), including the bottom-level table entry (153), have the value that allows access.

For example, a routine running in a domain (e.g., 101, 103, . . . , 105) can be denied of access to a page identified by the base (157) if any of the permission bits in the chain of page table entries leading to the base (157), including the bottom-level table entry (153), have the value that denies access. Alternatively, a routine running in a domain (e.g., 101, 103, . . . , 105) can be denied of access to a page identified by the base (157) only when all of the permission bits in the chain of page table entries leading to the base (157), including the bottom-level table entry (153), have the value that denies access.

For example, when a non-bottom-level page table entry (or page directory entry) indicates that the memory access is prohibited, the operations to translate from the virtual address (141) to the physical address (159) can be interrupted to reject the memory access associated with the virtual address (141). In response to the rejection, a trap to the software designated to handle the rejection is used.

For example, the security configuration (107) can include a set of sandbox setting bits (e.g., 111, 113, . . . , 115) for the set of domains (101, 103, . . . , 105) respectively. When a sandbox setting bit (e.g., 111, 113, . . . , or 115) corresponding to the current domain (123) in the domain register (117) is set to have a first value (e.g., 1 or 0), a current call from a routine (191) in the current domain (123) to a called routine (135) stored in the region (137) is implemented to use a sandboxing operation to protect the calling routine (191) and the called routine (135) from each other (e.g., by using a shadow stack to separate the caller and callee in stack usage). When a sandbox setting bit (e.g., 111, 113, . . . , or 115) corresponding to the current domain (123) in the domain register (117) is set to have a second value (e.g., 0 or 1), a call from the routine (191) in the current domain (123) to the called routine (135) stored in the memory region (123) is implemented without using the sandboxing operation to isolate the caller and callee from each other (e.g., without using a shadow stack).

Optionally, the security configuration (e.g., 107) is specified in the bottom-level page table (151) but not in the higher-level page tables (directories).

Figure 6:
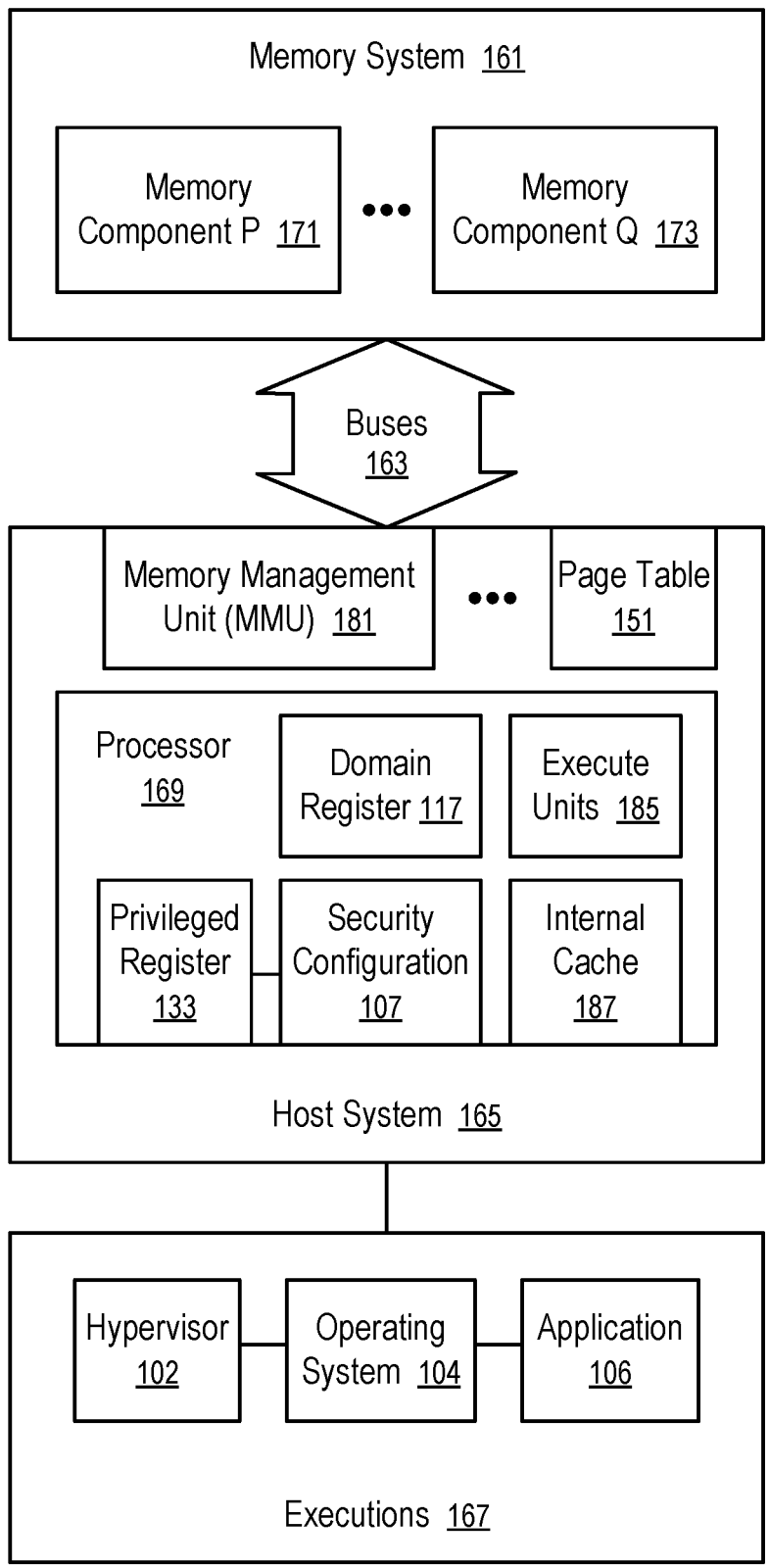
FIG. 6 shows a computer system having a domain register controlling security operations.

FIG. 6 shows a computer system having a domain register (117) controlling security operations.

For example, the computer system of FIG. 6 can optionally have a page table (e.g., 151) storing security configuration (107) for accessing memory region identified by a page table entry (153) of FIG. 5 by routines in predefined domains (101, 103, . . . , 105) illustrated in FIGS. 3 and 4. Further the computer system of FIG. 6 can optionally have the domain access tables (217, . . . , 227) of FIGS. 1 and 2 to facilitate and secure domain crossing.

For example, the computer system of FIG. 6 can have one or more permission registers storing the security configuration (107) for accessing the privileged register (133) for predefined domains (101, 103, . . . , 105) illustrated in FIGS. 3 and 4.

The domain register (117) of the processor (169) stores the identifier of the current domain (123). The content of the domain register (117) selects a set of applicable settings of the security configuration (107) corresponding to the current domain (123).

The computer system of FIG. 6 has a host system (165) coupled to a memory system (161) via one or more buses (163). The memory system (161) has memory components (171, . . . , 173).

For example, the buses (163) can include a memory bus connecting to one or more memory modules and/or include a peripheral internet connecting to one or more storage devices. Some of the memory components (171, . . . , 173) can provide random access; and the some of the memory components (171, . . . , 173) can provide persistent storage capability. Some of the memory components (171, . . . , 173) can be volatile in that when the power supply to the memory component is disconnected temporarily, the data stored in the memory component will be corrupted and/or erased. Some of the memory components (171, . . . , 173) can be non-volatile in that the memory component is capable of retaining content stored therein for an extended period of time without power.

In general, a memory system (161) can also be referred to as a memory device. An example of a memory device is a memory module that is connected to a central processing unit (CPU) via a memory bus. Examples of memory modules include a dual in-line memory module (DIMM), a small outline DIMM (SO-DIMM), a non-volatile dual in-line memory module (NVDIMM), etc. Another example of a memory device is a storage device that is connected to the central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). In some instances, the memory device is a hybrid memory/storage system that provides both memory functions and storage functions.

The memory components (171, . . . , 173) can include any combination of the different types of non-volatile memory components and/or volatile memory components. An example of non-volatile memory components includes a negative-and (NAND) type flash memory with one or more arrays of memory cells such as single level cells (SLCs) or multi-level cells (MLCs) (e.g., triple level cells (TLCs) or quad-level cells (QLCs)). In some instances, a particular memory component can include both an SLC portion and an MLC portion of memory cells. Each of the memory cells can store one or more bits of data (e.g., data blocks) used by the host system (165). Alternatively, or in combination, a memory component (171, . . . , or 173) can include a type of volatile memory. In some instances, a memory component (171, . . . , or 173) can include, but is not limited to, random access memory (RAM), read-only memory (ROM), dynamic random access memory (DRAM), synchronous dynamic random access memory (SDRAM), phase change memory (PCM), magneto random access memory (MRAM), Spin Transfer Torque (STT)-MRAM, ferroelectric random-access memory (FeTRAM), ferroelectric RAM (FeRAM), conductive bridging RAM (CBRAM), resistive random access memory (RRAM), oxide based RRAM (OxRAM), negative-or (NOR) flash memory, electrically erasable programmable read-only memory (EEPROM), nanowire-based non-volatile memory, memory that incorporates memristor technology, and/or a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

In general, a host system (165) can utilize a memory system (161) as physical memory (109) that includes one or more memory components (171, . . . , 173). The host system (165) can load instructions from the memory system (161) for execution, provide data to be stored at the memory system (161), and request data to be retrieved from the memory system (161).

In FIG. 6, the host system (165) includes a memory management unit (MMU) (181) and a processor (169). The processor (169) has execution units (e.g., 185), such as an arithmetic-logic unit. The processor (169) has registers (183, e.g., 133) to hold instructions for execution, data as operands of instructions, and/or results of instruction executions. The processor (169) can have an internal cache (187) as a proxy of a portion of the memory system (161).

In some instances, the host system (165) can include multiple processors (e.g., 169) integrated on a same silicon die as multiple processing cores of a central processing unit (CPU).

Routines programmed for executing in the processor (169) can be initially stored in the memory system (161). The routines can include instructions for a hypervisor (102), an operating system (104), and an application (106). The routines stored initially in the memory system (161) can be loaded to the internal cache (187) and/or the registers (183, e.g., 133) for execution in the execution units (185).

The running instances of the routines form the executions (167) of the hypervisor (102), the operating system (104), and the application (106). In some instances, a hypervisor (102) is not used; and the operating system (104) controls the hardware components (e.g., the memory system (161), peripheral input/output devices, and/or network interface cards) without a hypervisor.

The executions (167) of the hypervisor (102), the operating system (104), and/or the application (106) access memory (137) (e.g., in memory components (171, . . . , 173)) using virtual memory addresses (e.g., 141) defined in one or more virtual memory spaces (e.g., 127). At least one page table (151) (e.g., as illustrated in the FIG. 5) can be used to translate the virtual memory addresses (e.g., 141) used in the execution to the physical memory addresses (e.g., 159) of the memory components (e.g., 171, . . . , 173).

As illustrated in FIG. 3, the executions of the routines of hypervisor (102), the operating system (104), and the application (106) can be organized into a plurality of domains (101, 103, . . . , 105). For each of the execution domains (101, 103, . . . , 105) and a memory region (137) identified by a page table entry (153), the page table entry (153) identifies a set (e.g., 111, 113, . . . , 115) of security configuration bits for accessing the region (137) in pre-defined types of operations such as read, write, execution, etc. The configuration bits of the corresponding security configuration (e.g., 107) controls the memory accesses of the corresponding types from a respective execution domain (e.g., 101) and/or controls the sandboxing operations for isolating calling routines (e.g., 191) and called routines (e.g., 135).

The security configuration (107) of the privileged register (133) can be stored in separate permission registers. Each of the permission registers is pre-associated with a domain (e.g., 101, 103, . . . , 105). A permission register stores a permission bit for accessing the privileged register (133) from the corresponding domain (e.g., 101, 103, . . . , or 105). Different permission bits in the permission register can be configured for different privileged registers (e.g., 133). In some instances, a privileged register (133) can have multiple permission bits in a permission register for different types of accesses (e.g., read, write, execution).

Alternatively, permission bits for the privileged register (133) can be specified in a same permission register. Further, permission bits for different privileged register (e.g., 133) can be stored in different portions of the same permission register.

Figure 7:
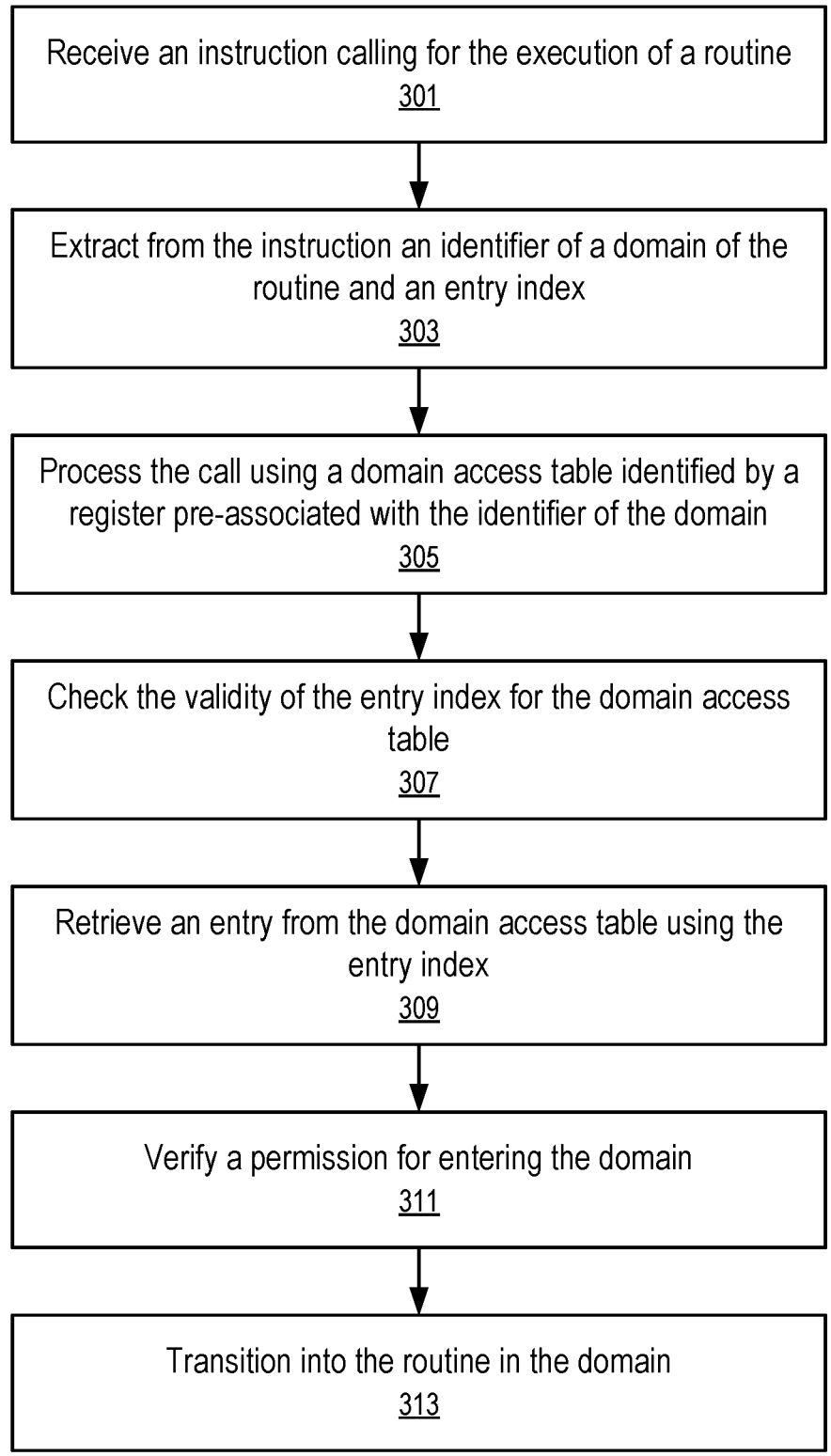
FIG. 7 shows a method to perform domain crossing in executing instructions in a computer processor.

FIG. 7 shows a method to perform domain crossing in executing instructions in a computer processor (169).

For example, the method of FIG. 7 can be performed in a computer system of FIG. 6, using domain access tables (217, . . . , 227) of FIGS. 1 and 2, a page table (151) of FIG. 5 specifying security configuration (107) of FIG. 4 for execution domains (101, 103, . . . , 105) illustrated in FIGS. 3 and 4.

At block 301, a computer processor (169) receives an instruction (193) calling for the execution of a routine (e.g., 191).

For example, the instruction (193) as illustrated in FIG. 1 can specify an identifier (197) of a domain (105) of the routine (e.g., 191) and an entry index (199) for looking up an entry in a domain access table (227) associated with the domain (105).

At block 303, the computer processor (169) extracts, from the instruction, an identifier (197) of a domain (105) of the routine (191) and an entry index (199).

At block 305, the computer processor (169) processes the call using a domain access table (227) identified by a register (229) pre-associated with the identifier (197) of the domain (105).

At block 307, the computer processor (169) checks the validity of the entry index (199) for the domain access table (227).

For example, the entry index (199) is outside of an upper bound and/or a lower bound of valid indexes for the domain access table (227) using the number of entries (221) stored in or with the domain access table (227).

At block 309, the computer processor (169) retrieves an entry (e.g., 223) from the domain access table (227) using the entry index (199), if the entry index (199) is valid.

At block 311, the computer processor (169) verifies a permission for entering the domain (105) via the entry point identified by the entry index (199).

For example, the permissions for different source domains (e.g., the domain of the instruction (193)) can be stored as part of the entry (223). Alternatively, the entry (223) can include a virtual memory address (141) of the routine (191); and the permission and/or other security option data for the routine (191) can be stored in as part of the security configuration (107) in a page table entry (153) used to convert the virtual memory address (141) to a physical memory address (159) to load the routine (193).

At block 313, the computer processor (169) transitions into the routine (193) in the domain (105).

For example, during transitioning into executing the routine (193), the computer processor (169) can update the domain register (117) by storing the domain identifier (197) of the destination domain (105) to identify the current domain (123). The current domain (123) specified in the domain register (117) control the selection of settings (e.g., 111, 113, . . . , or 115) of the security configuration (107) specified the respective domain (e.g., 101, 103, . . . , or 105) that matches with the current domain (123); and the selected settings (e.g., 111, 113, . . . , or 115) are used to control security operations during the execution of the routine (193).

The techniques disclosed herein can be applied to at least to computer systems where processors are separated from memory and processors communicate with memory and storage devices via communication buses and/or computer networks. Further, the techniques disclosed herein can be applied to computer systems in which processing capabilities are integrated within memory/storage. For example, the processing circuits, including executing units and/or registers of a typical processor, can be implemented within the integrated circuits and/or the integrated circuit packages of memory media to performing processing within a memory device. Thus, a processor (e.g., 101) as discussed above and illustrated in the drawings is not necessarily a central processing unit in the von Neumann architecture. The processor can be a unit integrated within memory to overcome the von Neumann bottleneck that limits computing performance as a result of a limit in throughput caused by latency in data moves between a central processing unit and memory configured separately according to the von Neumann architecture.

The description and drawings of the present disclosure are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications can be made thereto without departing from the broader spirit and scope as set forth in the following claims. The specification and drawings are, accordingly, to be regarded in an illustrative sense rather than a restrictive sense.

What is claimed is:

1. A processor, comprising:
   a logic circuit configured to execute instructions retrieved from a memory; and
   a plurality of registers, wherein the processor is operable to store, in the plurality of registers respectively, locations of a plurality of domain access tables, each respective domain access table in the plurality of domain access tables associated with a respective domain among a predefined set of domains of instructions loadable from the memory for execution in the logic circuit, the respective domain access table having one or more entries configured to identify one or more entry points of the respective domain;
   a first register configured to store an identifier of a current domain among the predefined set of domains, wherein instructions of a routine currently being executed in the processor are classified to be in the current domain;
   wherein in response to a transition of instruction execution from a first domain, among the plurality of domains of instructions, to a second domain different from the first domain, the processor is configured to validate a permission to enter the second domain using data specified for an entry point in a domain access table associated with the second domain;
   wherein in response to an instruction configured to request crossing of instruction execution from the current domain to a destination domain, the process is configured to update the first register to store an identifier of the destination domain specified in the instruction;
   wherein in response to the instruction, the processor is configured to determine, whether to isolate resources of a calling routine and a called routine.

2. The processor of claim 1, wherein the logic circuit includes a plurality of execution units.

3. The processor of claim 2, further comprising:
   a plurality of stacks configured for respective domains in the predefined set, wherein the processor is configured to use a corresponding stack, among the plurality of stacks, according to the first register.

4. The processor of claim 3, further comprising:
   a plurality of register value regions configured to store values of control registers for the respective domains in the predefined set;
   wherein the control registers include at least one of a program counter (PC), a stack pointer (SP), a frame pointer (FP), an argument pointer (AP), or a processor status word (PSW), or any combination thereof.

5. The processor of claim 2, wherein in response to the instruction, the processor is configured to control, based on a permission specified for a domain identified by the first register, access to a memory region during execution of the instruction.

6. The processor of claim 2, wherein in response to the instruction, the processor is configured to determine, based on a permission specified for a domain identified by the first register, whether to isolate resources of a calling routine and a called routine.

7. The processor of claim 2, wherein the instruction includes the identifier of the destination domain and an entry index; and the processor is configured to determine whether transition from the current domain to the destination domain is permitted according to data retrieved from a first domain access table using the entry index.

8. The processor of claim 2, wherein the instruction includes the identifier of the destination domain and an entry index; and the processor is configured to identify a first domain access table using the identifier of the destination domain and determine whether transition from the current domain to the destination domain is permitted by applying to the entry index to the first domain access table.

9. The processor of claim 8, wherein the processor is configured to determine whether transition from the current domain to the destination domain is permitted based on a bound check on the entry index using a count of entries in the first domain access table.

10. The processor of claim 8, wherein the processor is configured to determine whether transition from the current domain to the destination domain is permitted based on a bit in an entry in the first domain access table, the entry identified by the entry index specified in the instruction, and the bit identified using the identifier of the current domain.

11. A method, comprising:
    storing, in a plurality of registers of a processor, data representative of locations of a plurality of domain access tables, each respective domain access table in the plurality of domain access tables associated with a respective domain among a predefined set of domains of instructions loadable from memory for execution in the processor, the respective domain access table having one or more entries configured to identify one or more entry points of the respective domain;
    storing, in a first register of the processor, an identifier of a current domain among the predefined set of domains, wherein instructions of a first routine currently being executed in the processor are classified to be in the current domain;

receiving in the processor a first instruction of the first routine for execution, the first instruction containing an identifier of a destination domain among the predefined set of domains and configured to call a second routine having a second instruction in the destination domain, the first instruction further containing an entry index; and in response to the first instruction:
identifying, by the processor based on the identifier of the destination domain specified in the first instruction and the locations identified by the plurality of registers, a first domain access table;
determining, by the processor based on an entry identified by the entry index in the first domain access table, whether a transition from instruction execution in the current domain to instruction execution in the destination domain is permitted; and
determining, by the processor, whether the transition is permitted based on a bound check on the entry index according to a count of entries in the first domain access table.

12. The method of claim 11, further comprising:
retrieving, by the processor from the first domain access table, the entry identified by the entry index; and
determining, by the processor, a bit in the entry according to the identifier of the current domain, wherein whether the transition is permitted is based at least in part on the bit identified for the current domain in the entry.

13. The method of claim 12, further comprising:
determining, by the processor based on the entry, an address of the second instruction in the destination domain.

14. The method of claim 13, further comprising:
updating, by the processor in response to a determination that the transition is permitted, the first register to store the identifier of the destination domain specified in the first instruction.

15. The method of claim 12, further comprising:
determining, by the processor based on the entry, whether to isolate resources of the first routine containing the first instruction and the second routine called by the first instruction.

16. A computer, comprising:
memory configured to store instructions of routines; and
a processor coupled to the memory, the processor having:
a plurality of execution units;
a plurality of registers operable to store data representative of locations of a plurality of domain access tables, each respective domain access table in the plurality of domain access tables associated with a respective domain among a predefined set of domains of instructions loadable from the memory for execution in the plurality of execution units, the respective domain access table having one or more entries configured to identify one or more entry points of the respective domain;
a first register operable to store an identifier of a current domain among the predefined set of domains, wherein instructions of a first routine currently being executed in the processor are classified to be in the current domain;
wherein in response to a first instruction the first routine being loaded in the processor for execution, the processor is configured to:
identify, based on an identifier of a destination domain specified in the first instruction and the locations identified by the plurality of registers, a first domain access table; and
determine, based on an entry identified by the entry index in the first domain access table, whether a transition from instruction execution in the current domain to instruction execution in the destination domain is permitted;
wherein the processor is further configured to determine whether the transition is permitted based on a bound check on the entry index according to a count of entries in the first domain access table, and a bit identified in the entry according to the identifier of the current domain.

17. The computer of claim 16, wherein the processor is further configured to determine, based on the entry:
an address of a second instruction of a second routine in the destination domain; and
whether to isolate resources of the first routine containing the first instruction and the second routine called by the first instruction.

* * * * *